United States Patent [19]

Miller

[11] Patent Number: 4,663,797
[45] Date of Patent: May 12, 1987

[54] WIPER ARM SAFETY DEVICE

[76] Inventor: Richard E. Miller, P.O. Box 327, Forest Lake, Minn. 55025

[21] Appl. No.: 800,453

[22] Filed: Nov. 21, 1985

[51] Int. Cl.⁴ ............................................. B60S 1/32
[52] U.S. Cl. ............................ 15/250.19; 15/250.35
[58] Field of Search ............ 15/250.19, 250.35, 250 R

[56] References Cited

U.S. PATENT DOCUMENTS 2,246,740  6/1941  Lethbridge .................... 15/250.19
2,717,408  9/1955  Page ............................ 15/250.19

FOREIGN PATENT DOCUMENTS 59-100035  6/1984  Japan ........................ 15/250.19
610697     5/1978  U.S.S.R. .................... 15/250.19

Primary Examiner—James Kee Chi
Attorney, Agent, or Firm—Vidas & Arrett

[57] ABSTRACT

A safety device for attachment to a wiper arm assembly to prevent metal from contacting and scratching the windshield if the wiper blade is lost or damaged. The device includes a body which is attached to a wiper arm and has a wheel member journalled to the body. The wheel is positioned to contact the windshield and freely roll across the glass with the wiper arm if the wiper blade is missing.

2 Claims, 6 Drawing Figures

WIPER ARM SAFETY DEVICE

DESCRIPTION

1. Field in the Invention

The present invention relates to a device to be attached to a wiper arm assembly which will prevent contact of metal to glass in the event that the wiper blade is removed from the wiper assembly.

2. Background of the Invention

Windshield wipers generally include a powered wiper lever arm to which a wiper blade set is connected by a pivot pin. The wiper blade set includes a rubber blade member which provides the wiping action on the windscreen of the vehicle. Since the rubber of the wiper blade set is much softer than the glass of the windscreen, there is ordinarily little or no wear which would affect the optical quality of the glass. However, consumers generally do not replace their wiper blade sets when required and hence may suddenly experience a failure of the wiper blade set which is typically manifested by the sudden separation of the wiper blade set from the wiper arm. The metal wiper lever arm is then free to contact the glass surface of the windscreen which scratches and may severaly damage the glass which it contacts.

A. I. Urvachev, in Russian Patent No. 610,697 which issued on May 23, 1978, describes a safety device for use with windshield wipers. In Urvachev, a tip is fitted onto the wiper lever adjacent its end such that a lug portion would bear against the windscreen if the wiper blade were to be removed. The tip is made of a material which is softer than glass in order to prevent scratching. The tip is fitted on to the lever with a preload.

While devices such as those shown in Urvachev may prevent immediate damage to the glass of a windshield they suffer from a number of defects. Unless the wiper blade is immediately replaced after its sudden loss, the constant rubbing of the tip of a Urvachev type device against the glass may damage the lug which bears against the windscreen to the point that it is no longer effective to maintain a separation between metal and glass. Additionally, the point contact against the windscreen may cause the remaining wiper blade of a twin set to move eratically and motor failure or damage may result.

BRIEF SUMMARY OF THE INVENTION

This invention consists of a wiper arm safety device which may be readily added to existing wiper arms or may be fabricated as part of an original equipment manufacture to prevent damage to the glass of a windshield and the wiper motor. The device consists of a relatively small block of material, preferably plastic, which may be attached to the underside of a wiper lever arm. A rotatable wheel is journalled to the block such that it can roll back and forth with the movement of the wiper arm. Preferably, the wheel is formed of a plastic or other material which is softer than glass. In the absence of a wiper blade or if the rubber of the wiper blade set breaks loose, the wiper lever arm will ride on the wheel of the device and travel back and forth without damaging the windshield. The device causes minimal friction to reduce any load on the wiper motor.

When a device of the invention is equipped on each wiper lever arm of a windshield wiper set, it will be possible for the operator of the vehicle to continue using the windshield wipers for a prolonged period since no damage will occur either to the glass of the windscreen or to the motor assembly. Pilots, truck drivers and other operators who must drive for long distances between stops will be able to continue their journeys without damage due to the inclusion of the device of the invention.

The unavailability of a replacement wiper blade set at certain times of day or in certain locations may prevent the operator from being able to replace a wiper blade set immediately after its loss or damage. With the device of the invention in position, the operator may continue without damage to the glass or motor.

BRIEF DESCRIPTION OF THE DRAWINGS

A detailed description of one preferred embodiment of the invention is hereafter described with specific reference being made to the drawings in which.

DETAILED DESCRIPTION OF THE INVENTION

Figure 1:
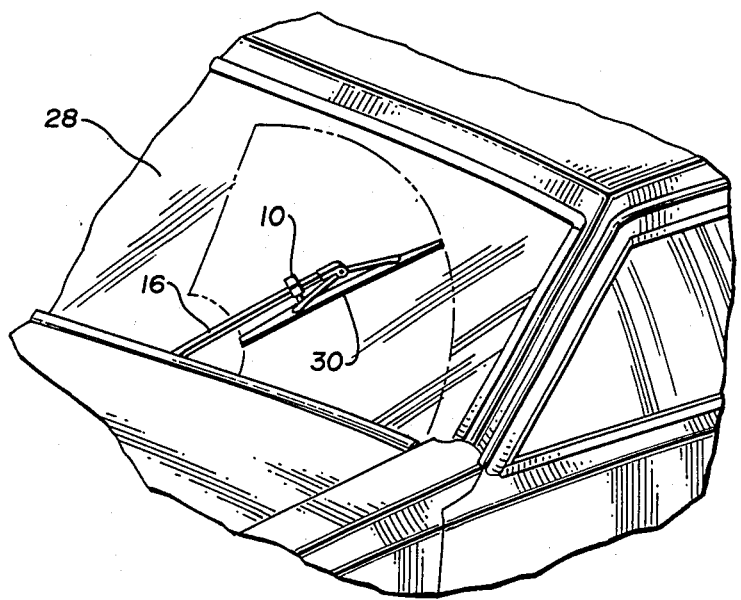
FIG. 1 is a partial perspective view of a vehicle showing a windscreen and a wiper arm assembly with the device of the invention in place.
Figure 2:
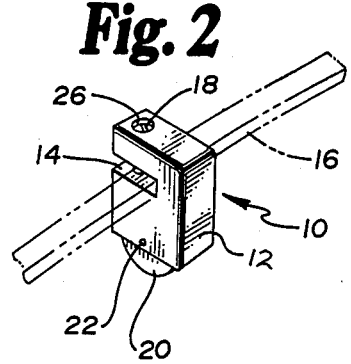
FIG. 2 is a perspective view of the wiper arm safety device of the invention showing its attachment to a wiper lever arm which is drawn on phantom.
Figure 3:
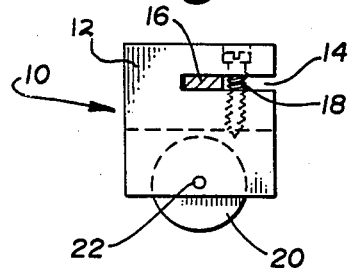
FIG. 3 is a side elevational view of the wiper arm safety device.
Figure 4:
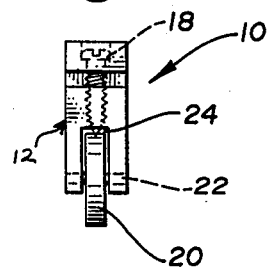
FIG. 4 is an end view of the wiper arm safety device.
Figure 5:
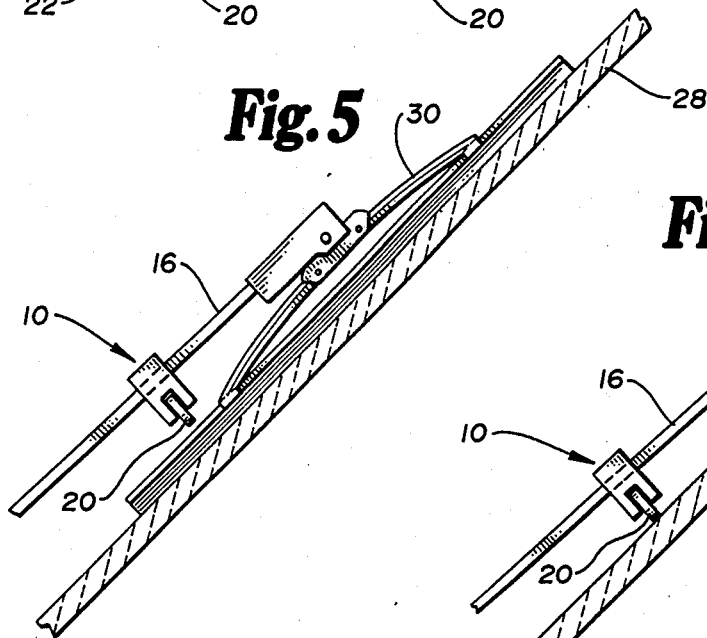
FIG. 5 is a side view of a wiper arm assembly complete with a wiper arm safety device with the windshield glass shown in cross section.
Figure 6:
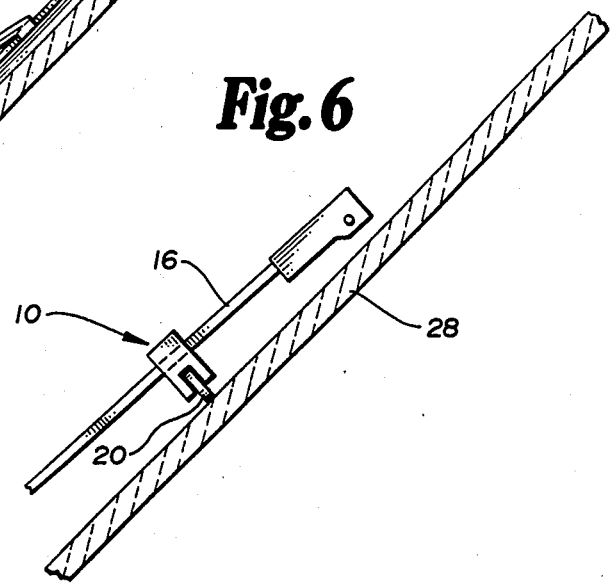
FIG. 6 is a side view of a wiper lever arm supported above the windscreen by wiper arm safety device of the invention.

With reference to the figures it will be seen that the device 10 of the invention is formed of a block 12 of material which in the figures is generally rectangular in shape. A slot 14 extends partially through the block 12 as best shown in FIGS. 2 and 3. Slot 14 is formed such that the cavity is large enough to receive a wiper lever arm 16. Device 10 is fixedly secured to wiper lever arm 16 by screwing in screw 18 through block 12 which draws slot 14 closed, thereby securely holding wiper lever arm 16 thereto. As best shown in FIG. 3, arm 16 shown in cross-section is held within slot 14 when screw 18 pulls the slot closed.

The lower portion of device 10 includes a wheel member 20 which is journalled to the lower portion of block 12 by means of an axle or pin 22 so as to permit rotational movement. Preferably, block 12 is machined or formed such that a recess 24 is formed into which a portion of wheel 20 normally resides as shown in FIGS. 2–6. Preferably, the center of the wiper arm is over the center of the wheel.

Block 12 and wheel 20 are preferably both formed from a material which is softer than glass. This construction prevents scratching of the glass in the event that either the block or wheel were to contact the windshield. However, block 12 as shown in the Figures is designed such that it will not contact the windshield and, therefore, could be formed of metals or other substances which are harder than windshield glass.

EXAMPLE

The device of the invention was inexpensively and quickly created by machining a block of an ultra high moleculure weight polyethylene obtained from Poly-Hi, a division of Manasha Corporation of Fort Wayne, Ind., to form slot 14 and recess 24. Threads 26 were then cut into the block 12 for sheet metal screw 18. A wheel 20 formed of the same material was fitted to block 12 by inserting a pin 22 through block 12 and through a hub of wheel 20. Free rotation of the wheel provided for by utilizing a pin having a slightly smaller diameter than the diameter of the hub of the wheel. Pin 22 may be held to the block by friction or by slightly peening the ends of the pin which protrude beyond the limits of the block.

In operation, a device 10 of the invention is fitted onto a wiper lever arm 16 such that wheel 20 faces the windshield 28 of the vehicle. Screw 18 is then tightened to rigidly hold device 10 to the wiper lever arm. As shown, wiper arm 16 is mounted directly and the center of wheel 20.

Device 10 of the invention does not affect the operation of the wiper blade set 30 during normal operation. However, if the wiper blade set is lost due to missing screws or breakage, the spring which normally urges the wiper lever arm towards the windshield glass merely serves to push wheel 20 of the device against the windshield. If the windshield wipers were in operation at the time of the loss of the wiper blade set, the operator does not need to immediately turn off the wiper motor. Device 10 of the invention allows the damaged wiper arm to move freely back and forth as though a wiper blade set was still in position. Wheel 20 smoothly glides across the surface of the glass without causing damage to the glass or putting a strain on the wiper motor. The other wiper arm of a two wiper blade set is able to continue which means that the operator can safely drive the vehicle until a replacement blade can be found. If a driver's side wiper blade set is damaged, it may be replaced with the passenger wiper blade set until a replacement is obtained. In the meantime, the easy rotation provided by the device of the invention allows the operator to proceed no matter what the distance is to the next source of wiper blade replacement kits. The operator may also continue throughout the night rather than stopping and waiting for a shop to open which stocks the wiper blade sets.

Device 10 of the invention may be formed as part of an original equipment manufacture by fabricating a lever arm to include a downwardly depending member to which a wheel is journalled. The wheel itself may be fabricated such that the glass contacting surface is formed from a relatively soft material and the hub forming portion of the wheel may be a harder material such as metal.

In considering this disclosure it must be remembered that the disclosure is illustrative only, and that the scope of the invention is to be determined only by the appended claims.

What is claimed is:

1. In a windshield wiper system consisting of a wiper lever arm, a wiper blade assembly attached to a free end of the wiper lever arm, said wiper blade assembly including a wiper rubber for contacting a windshield; the improvement comprising:

a wiper lever arm having a member projecting toward the glass of a windshield when installed, said member including wheel means comprising a wheel having a rim journalled to said member for rotational movement with an axle, the axle of said wheel being parallel to the axis of said wiper lever arm, said wheel means being constructed and arranged such that a portion of said wheel extends beyond said member toward the glass of a windshield when installed so the wheel would contact such glass and said wiper lever arm would not contact such glass if the wiper blade assembly becomes detached from said wiper lever arm, said wheel means being constructed and arranged such that no portion of said wheel means extends downwardly so as to be lower than the uppermost portion of wiper blade assembly attached to said wiper lever arm.

2. The wiper lever arm of claim 1 wherein at least the rim of said wheel is constructed of a material which is softer than windshield glass so as to prevent scratching due to contact between said wheel and glass.

* * * * *